US006892316B2

(12) United States Patent
Eide et al.

(10) Patent No.: US 6,892,316 B2
(45) Date of Patent: May 10, 2005

(54) SWITCHABLE RESOURCE MANAGEMENT IN CLUSTERED COMPUTER SYSTEM (75) Inventors: Curtis Shannon Eide, Rochester, MN (US); James Lee Naylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/002,232

(22) Filed: Nov. 2, 2001

(65) Prior Publication Data

US 2004/0078455 A1 Apr. 22, 2004

(51) Int. Cl.[7] .............................................. G06F 11/00
(52) U.S. Cl. ............................................ 714/3; 714/7
(58) Field of Search ................................... 714/3, 7

(56) References Cited

U.S. PATENT DOCUMENTS 6,314,526 B1 * 11/2001 Arendt et al. .................. 714/4

* cited by examiner

Primary Examiner—Bryce P. Bonzo
(74) Attorney, Agent, or Firm—Wood, Herron & Evans, LLP (57) ABSTRACT An apparatus, clustered computer system, program product and method assist in the distribution of configuration data such as VPD for a switchable resource to multiple nodes within a clustered computer system. Program code operating as a resource manager is used to enroll a node to receive updates to a switchable resource in the clustered computer system, and, in response to an update to the switchable resource, to notify each enrolled node of the update. Moreover, configuration data is communicated along with the notification to each enrolled node, such that any data required to initiate acquisition of functional ownership of a switchable resource by any such node will be locally available to such node.

28 Claims, 3 Drawing Sheets

SWITCHABLE RESOURCE MANAGEMENT IN CLUSTERED COMPUTER SYSTEM

FIELD OF THE INVENTION

The invention is generally directed to clustered computer systems, and in particular, to the management of switchable resources.

BACKGROUND OF THE INVENTION

"Clustering" generally refers to a computer system organization where multiple computers, or nodes, are networked together to cooperatively perform computer tasks. Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

To further enhance system availability, it would be desirable in many clustered computer systems to also incorporate the concept of "switchable" hardware resources that are capable of being managed, or functionally "owned" by different nodes at different times, so that access to a particular hardware resource can be maintained even in the event of a failure or shutdown of a node that principally manages the operation of such a hardware resource. In many clustering environments, for example, resources are required to be owned or managed by only one node at a time, irrespective of whether such resources are shareable from an access standpoint.

For example, in the AS/400 or iSeries eServer clustering environment available from International Business Machines Corporation, it may be desirable to define cluster resource groups (CRG's) that manage cluster resources such as direct access storage devices (DASD's) and other hardware components. CRG's support the ability to define primary and backup nodes through which resource management is performed, such that, in response to a shutdown or failure in the primary node, the backup node will automatically assume management of a resource that was previously being managed by the primary node.

In order to effectively switch over hardware resources, however, certain information about such hardware resources typically must be known by those nodes in a clustered computer system that are capable of managing such resources. For example, in an AS/400 or iSeries eServer midrange computer such as that used in the aforementioned clustering environment, the Input/Output (I/O) infrastructure of each computer typically maintains configuration data for each logical and physical hardware entity accessible by that computer. Whenever a switchable resource is being managed by a computer that functions as a node in a clustered computer system, therefore, configuration data for that switchable resource must be maintained within that computer.

In traditional non-clustered environments the logical and physical hardware entities represented in the I/O infrastructure of a computer are all under the domain of that computer, i.e., the entities are all interfaced directly with and controlled by a single computer. However, when clustering is introduced, a difficulty arises as to obtaining configuration data for resources that are outside of the domain of a particular computer, e.g., when that configuration data is only available from certain entities in the system.

From the perspective of inter-node communication, many clustered computer environments require that configuration data regarding the other nodes in a clustered computer system be represented within the I/O infrastructure of each node. For example, configuration data regarding input/output (I/O) adaptors that physically couple nodes together over a communication network may be maintained in a node for the purpose of establishing a logical communication channel between two nodes and thereafter directing communications over the channel. Automated functionality is typically provided in such clustering environments to distribute such configuration data among the various nodes, e.g., during initial startup of a cluster or whenever a new node is added to a cluster.

For switchable hardware resources, however, distribution of configuration data is not as straightforward. In particular, in many environments, the configuration data for a switchable resource may only be accessible from a node that has a particular relationship with that resource, e.g., due to the node's functional ownership or other controlling relationship over the resource. However, given that nodes in a cluster may come and go dynamically, the configuration data for a particular resource may not always be remotely accessible from the appropriate node. Keeping a current copy of the configuration data for a particular switchable resource on each node capable of managing that resource is thus important to ensuring the continued availability of the resource.

Therefore, a significant need exists in the art for a manner of managing switchable resources in a clustered computer environment, and in particular, a manner of distributing configuration data associated with a switchable resource to the nodes capable of managing the resource.

SUMMARY OF THE INVENTION

The invention addresses these and other problems associated with the prior art by providing an apparatus, clustered computer system, program product and method that assist in the distribution of configuration data such as VPD for a switchable resource to multiple nodes within a clustered computer system. Program code operating as a resource manager is used to enroll a node to receive updates to a switchable resource in the clustered computer system, and, in response to an update to the switchable resource, to notify each enrolled node of the update. Moreover, in some embodiments consistent with the invention, configuration data may be communicated along with the notification to each enrolled node, such that any data required to initiate acquisition of functional ownership of a switchable resource by any such node will be locally available to such node.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter manage switchable resources such as switchable towers in a clustered computer system through a notification scheme whereby nodes in a cluster are permitted to "enroll" to receive notifications of updates to switchable resources, and thereafter be automatically notified of such updates. In connection with such notifications, configuration data, often referred to as vital product data (VPD), may be provided to the notified nodes, such that any data required to initiate acquisition of functional ownership of a switchable resource by any of such nodes will be locally available to such nodes.

Enrollment of a node to receive notifications may include storage of an identifier for the node in a data structure that is accessed whenever it is determined that a notification needs to be sent, or in the alternative, a relatively more complex subscription scheme may be used in the alternative. For example, as described below, a local proxy-type object may be subscribed or registered with a resource manager to receive notifications of updates, with that object utilized to manage transmission of configuration data to a remote subscribed node. Other enrollment/subscription schemes may also be used in the alternative.

Furthermore, the types of switchable resources that can be managed in the manner described herein can vary in different applications. In the illustrated embodiments described hereinafter, for example, the switchable resources are switchable towers that manage one or more storage devices such as disk units as independent auxiliary storage pools (IASP's). In other environments, however, the switchable resources may be implemented as any combination of hardware resources that may require some form of management by the nodes of a clustered computer system, including other types of storage devices or storage systems, printers and other types of imaging devices, I/O adaptors of all types (communications, workstation, cryptography, storage, etc.), etc.

Moreover, the types of updates that can trigger notification of a node typically include any updates associated with any modification of the configuration data associated with a particular resource, e.g., whenever a new resource is coupled to or removed from a system, or whenever the configuration data of the resource or any components encapsulated thereby is modified. In the case of a switchable tower, for example, any replacement, addition or removal of a field replaceable unit (FRU) installed in a tower, e.g., individual disk drives, fans, power supplies, I/O adapters, etc., may alter the configuration data associated with that tower. In such instances, the set of installed FRU's for a tower typically is modified.

In addition, in the illustrated embodiments discussed hereinafter, it is assumed that all nodes participating in a cluster are automatically enrolled with a resource manager when such nodes participate in a cluster, and moreover, that all switchable resources managed by a cluster are managed by the herein-described resource management functionality. It is also assumed that all nodes will be notified of updates to any managed switchable resource, regardless of the type of update or the particular switchable resource. However, it should be appreciated that in other embodiments, it may be desirable to enroll only a subset of nodes to receive notifications (e.g., if only some nodes are capable of managing a particular resource), as well as to enroll a node to receive notifications pertaining to only a subset of switchable resources and/or a subset of update activities, or event types. Implementation of such functionality would be within the ability of one of ordinary skill in the art having the benefit of the instant disclosure, and as such, the invention is not limited to the particular embodiments described herein.

Figure 1:
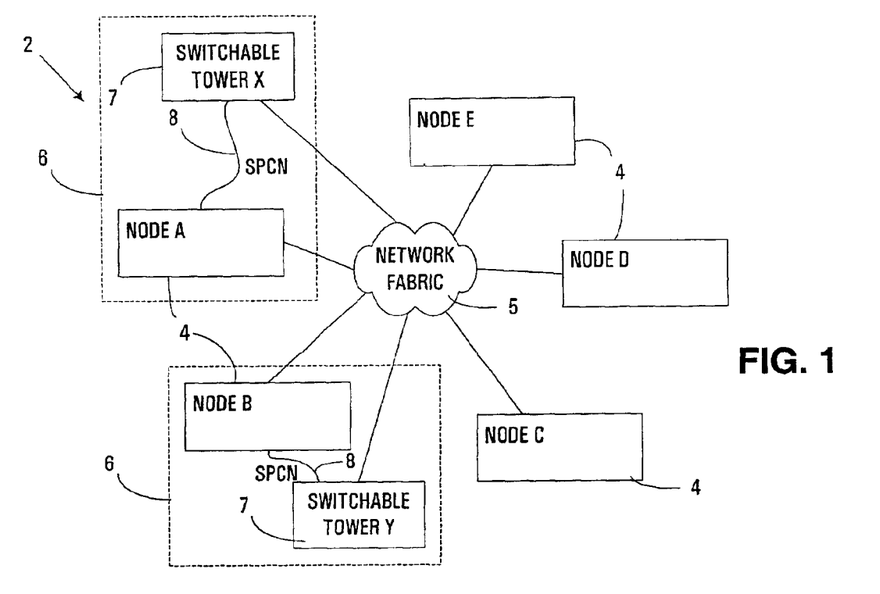
FIG. 1 is a block diagram of a clustered computer system consistent with the invention.

Now turning to the Drawings, wherein like numbers denote like parts throughout the several views, FIG. 1 shows a clustered computer system 2 including a plurality of nodes (systems) 4 interconnected with one another via a network fabric 5. Any number of network topologies commonly utilized in clustered computer systems may be used consistent with the invention, e.g., a high speed point-to-point bus or link, a local area network, a wide area network, a public network such as the Internet, etc., and combinations thereof. Moreover, individual nodes 4 may be physically located in close proximity with other nodes, or may be geographically separated from other nodes, as is well known in the art. In an environment such as an AS/400 or iSeries eServer clustering environment available from International Business Machines Corporation, for example, network fabric 5 may comprise a Remote Input/Output (RIO) loop, the use and configuration of which is well known in the art.

Clustered computer system 2 may also incorporate one or more switchable resources such as a switchable tower 7, which may be interconnected with the various nodes 4 through network fabric 5, and as will be discussed in greater detail, may be functionally "owned" or managed by any of nodes 4. Moreover, in some instances, a switchable resource may be within a "domain" 6 defined for a single one of nodes 4, regardless of the functional ownership of the switchable resource. As an example, FIG. 1 illustrates an exemplary set of nodes 4 (denoted as Nodes A–E), and a pair of switchable resources, here switchable towers 7 (denoted as switchable towers X and Y). Tower X is illustrated as being within the domain 6 of Node A, while Tower Y is illustrated as being within the domain 6 of Node B.

For the purposes of switchable resource management, a switchable resource is considered to be within the domain of whatever node is able to provide configuration data that is necessary for use by other nodes in connection with obtaining functional ownership of the switchable resource. A switchable resource in the hereinafter described embodiments, for example, is required to be within the domain of a single node, and this domain generally cannot be modified for a particular resource short of physically disconnecting the resource and reconnecting it to another node. In other environments, however, multiple nodes may be capable of providing configuration data for a switchable resource, so a resource may be within a domain that can change from time to time, or may not even be considered to be within any particular domain.

Moreover, in the illustrated embodiments discussed hereinafter that rely upon an AS/400 or iSeries eServer environment, a switchable resource is considered to be within a domain of a node if that resource is within the power domain for that node, i.e., where the node provides power management functionality for the switchable tower. In such environments, a switchable resource such as a tower is typically connected to the System Power Control Network (SPCN) of the node (e.g., via the SPCN network interconnects 8 for Towers X and Y), and it is over this connection that configuration data for the tower is obtained by the domain node.

Figure 2:
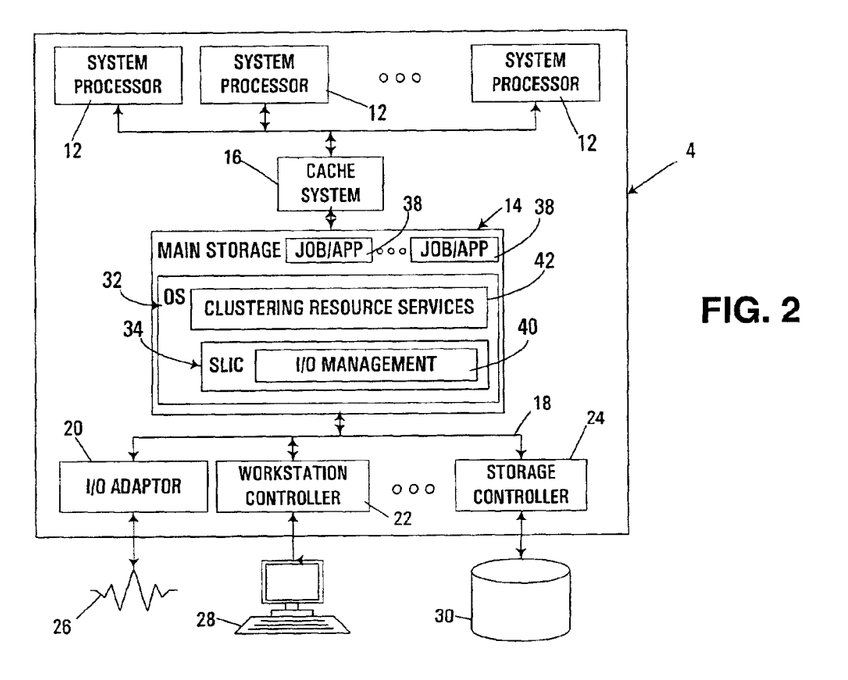
FIG. 2 is a block diagram of a node in the clustered computer system of FIG. 1.

Now turning briefly to FIG. 2, an exemplary hardware configuration for one of the nodes 4 in clustered computer system 2 is shown. Node 4 generically represents, for example, any of a number of multi-user computers such as a network server, a midrange computer, a mainframe computer, etc., e.g., an AS/400 or iSeries eServer midrange computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Node 4 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output (I/O) adaptor 20, a workstation controller 22 and a storage controller 24, which respectively provide external access to one or more external networks (e.g., a network 26), one or more workstations 28, and/or one or more storage devices such as a direct access storage device (DASD) 30. Any number of alternate computer architectures may be used in the alternative.

To implement the herein-described clustering functionality in an AS/400 or iSeries eServer environment, each node in a cluster typically includes operating system program code 32 including, for example, system licensed internal code (SLIC) 34, as well as one or more jobs or applications 38. Each of components 32, 34 and 38 are shown resident in main storage 14, but it will be appreciated that such components (or portions thereof) are typically selectively paged in and out of the main storage in practice using a virtual memory management system that is well known in the art.

A portion of the SLIC 32 is typically allocated to input/output (I/O) resources, represented by I/O management block 40. Moreover, when utilized in a clustering environment, node 4 typically executes a clustering infrastructure referred to as clustering resource services 42 to manage the clustering-related operations on the node. In addition, clustering may require the execution of a cluster control (CCTL) job as one of jobs 38 that participates in a cluster control group to assist in managing clustering functionality on behalf of the node.

It will be appreciated, however, that the functionality described herein may be implemented in other layers of software in node 4, and that the functionality may be allocated among other programs, computers or components in clustered computer system 2. In particular, in non-AS/400 environments, the system program code as well as clustering infrastructure may be implemented in other layers of program code.

Moreover, other clustering environments typically rely on functionality analogous to a clustering infrastructure and a cluster control group. Therefore, the invention is not limited to the specific software implementation described herein.

The discussion hereinafter will focus on the specific routines utilized to implement the above-described switchable resource management functionality. In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 3:
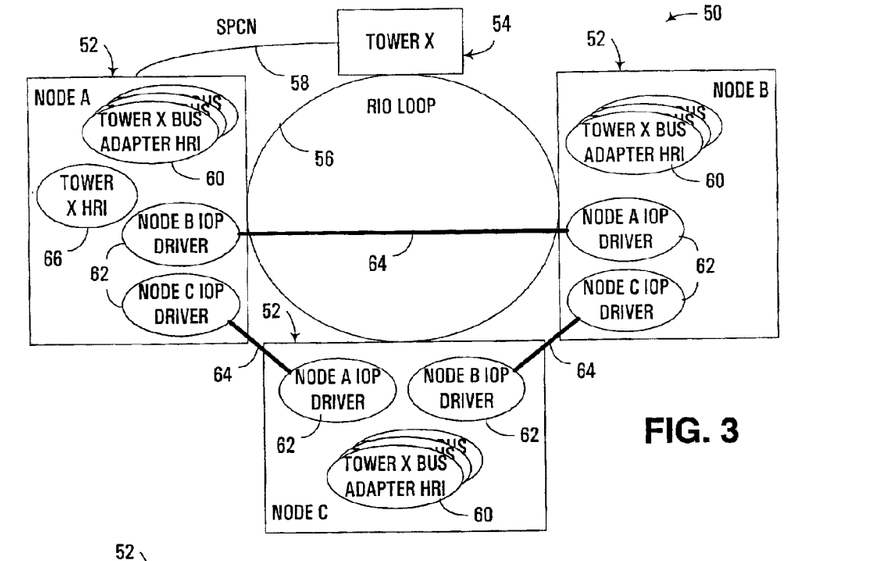
FIG. 3 is a block diagram of the principal hardware and software entities utilized in switchable tower I/O management in the clustered computer system of FIGS. 1 and 2.

Now turning to an exemplary implementation of the aforementioned resource management functionality in an AS/400 or iSeries eServer clustering environment, FIG. 3 illustrates a clustered computer system 50 (which is based upon the basic hardware design of system 2 of FIGS. 1 and 2), including three exemplary nodes 52 (denoted Nodes A, B and C), and one exemplary switchable tower 54 (denoted Tower X), coupled via a RIO loop 56 that functions as the network fabric for the clustered computer system. In this exemplary implementation, Tower X is within the domain of Node A, by virtue of the interconnection 58 to the SPCN of Node A.

In this exemplary implementation, much of the known I/O management functionality of an AS/400 or iSeries eServer midrange computer is utilized in connection with switchable resource management consistent with the invention. A background of such I/O management functionality is described, for example, in U.S. Pat. No. 6,243,774, the disclosure of which is incorporated by reference herein.

The I/O infrastructure in the aforementioned hardware environment maintains a Hardware Resource Information (HRI) object for each logical and physical hardware entity on the system. An HRI object is a collection of information about a hardware entity. A logical HRI object typically includes a collection of information about a logical hardware entity, including VPD such as type, model, and serial number; functional characteristics; and logical address(es). A packaging HRI object typically includes information about a physical hardware entity, including VPD such as type, model, serial number, part number, and plant of manufacture; and physical location information. For a tower, the relevant VPD may include, for example, information such as the physical location, type, model, serial number, part number, etc. for the tower.

The packaging and logical HRI objects are related to each other based on which physical hardware entity a given logical entity is associated with. For example, an communications adapter card with two connectors is a physical hardware entity for which there is a packaging HRI object. The firmware in the I/O adapters and I/O processors reports as logical entities a communications 10A and two ports, all of which are said to be associated with the single packaging HRI object representing the physical card. Similarly, I/O buses are logical entities that are associated with the packaging HRI for the tower in which the logical buses reside. HRI objects are created when the system detects, or receives notification of, a logical or physical hardware entity. The majority of HRI objects are created at system initial program load (IPL), or boot up time, but additional HRI objects may be created if new hardware is added to the system or is powered on after the system IPL completes.

In the illustrated implementation, there is one packaging HRI object for each tower that a node owns functionally. For non-switchable towers, this includes all towers that are in a node's power domain (i.e., where the SPCN cable for the tower is connected to the node). For switchable towers, this includes all towers that are currently switched to, or managed by, the node. A switchable tower may therefore be in one node's power domain, but be owned functionally by a different node if the tower is switched to that node. The node whose power domain includes a switchable tower may be referred to as the primary system, or the power controlling system with respect to the tower. The node that does not control a tower's power, but to which the tower may be switched, may be referred to as the alternate system, or non-power controlling system. The node that a tower is switched to and therefore owns the tower functionally may also be referred to as the owning system of the tower.

In an AS/400 or iSeries eServer environment, a portion of the VPD required to create a packaging HRI object for a tower comes via the SPCN connection to the power controlling system. Thus, in such an environment, an alternate, or non-power controlling, system is typically unable to create the packaging HRI for a switchable tower without assistance from the primary, or power controlling, system in the form of the VPD acquired via the SPCN connection. Without the VPD, other systems might not be aware of necessary information included about a tower, e.g., whether or not a bus adaptor is embedded, or the various serial numbers, part numbers, and the like for the components housed in the tower.

Also, in the aforementioned environment, each switchable tower typically includes at least one I/O or bus adapter on which the RIO connector for the tower resides. The bus adapter allows the tower to be connected to the RIO loop and is the hardware entity that the operating system interfaces with to switch a tower from one system to another. Because there is a functional aspect to the bus adapter (the fact that the operating system interfaces with it to switch a tower and query the current owner, primary system, alternate system, etc.), a logical HRI object must be created for the bus adapter. In some towers, the bus adaptor may be embedded on the tower backplane, in which case the logical HRI object needs to be associated with the packaging HRI object for the backplane. In other cases, the bus adapter may be a separate, pluggable card, in which case the logical HRI object may be associated with the packaging HRI object for the card.

A portion of the VPD required to create a logical HRI object for a bus adapter, and match the unique identifier (UID) passed in by a cluster management client to the appropriate bus adapter HRI object, is typically available only on the node that functionally owns the tower in which the bus adapter resides. Thus, in many instances it is not possible for a non-owning system to create a logical HRI object for the bus adapter in a switchable tower without assistance from the functional owner in the form of the VPD available only from the node that owns the tower functionally.

The herein-described I/O infrastructure also typically creates a logical connection between each node in a cluster over which system information is exchanged so each node knows about all of the other nodes in the cluster. Data exchanged over this connection typically includes system names, operating system versions, main memory sizes, etc. The SLIC Transport Manager on any given node typically creates an IOP hardware driver (often referred to as a Remote HSL Network IOP in the Hardware Service Manager, and referred to herein as a remote network object) for each of the other nodes in the cluster. The IOP hardware driver creates and opens the logical connection to the other node the driver represents and exchanges system information with the other node.

Thus, as shown in FIG. 3, when system 50 is in an active state, each node 52 maintains a logical bus adapter HRI object 60 for each bus adapter accessible on the RIO loop 56, including those of each node and each switchable tower. Moreover, each node 52 maintains IOP hardware drivers 62, also known as remote HSL network IOP objects, that function as proxy objects for each additional node in the system, and thereby establish logical connections 64 between each pair of nodes in the system (i.e., for system 50, a Node A-Node B connection, a Node A-Node C connection, and a Node B-Node C connection).

However, only the node that currently has functional ownership of a switchable resource maintains a current packaging HRI object for that switchable resource at any given time. Thus, as also shown in FIG. 3, a packaging HRI object 66 for Tower X is maintained in Node A to represent functional ownership of Tower X by Node A. As will become more apparent below, each node will typically locally maintain the necessary VPD for each switchable resource to enable any node that desires to assume functional ownership of a switchable resource to create the packaging HRI object as necessary.

In the illustrated implementation, in order for one node in a cluster (e.g., the backup) to take ownership of a switchable tower from a different node in the cluster (e.g., the primary) that has failed or is being taken offline, the backup must have a token or handle (e.g., a UID) to identify the tower (or in the least, a bus adaptor for the tower), and the tower management code must have information about that tower that allows it to match the token/handle to the particular tower that is to be switched, and to build the proper packaging and logical HRI objects when such a tower is actually switched over to it. Specifically, in the illustrated implementation, the switchable resource VPD, available from the domain node via the SPCN, is distributed to the other nodes in a cluster so such nodes can create the packaging HRI object for the switchable tower when the tower does switch over to an alternate and correlate all the logical resources that report in as a result of taking ownership to the tower itself. The bus adapter VPD, available from the node that has functional ownership of the tower, is distributed to the other nodes in a cluster so such nodes can create the logical HRI object for the bus adapter in each switchable tower and correlate the UID passed in by a cluster management client to the appropriate bus adapter HRI object so the client can switch the adapter from one node to another.

The illustrated implementation therefore performs switchable resource management consistent with the invention principally for the purpose of exchanging with non-domain nodes the necessary configuration data, or VPD, regarding a tower, which is available only on the domain node for that tower. It should be noted that this distribution of switchable resource VPD is in addition to the distribution of VPD for entities such as node bus adapters and the like, which is distributed upon initial startup of a cluster, or addition of a node to a cluster, in a manner that is understood in the art.

Moreover, in the illustrated implementation, a resource manager is utilized within each node to maintain two data structures, or lists, that are relevant to switchable resource management. The first list includes an identifier for each tower in the node domain. The second list includes an identifier associated with each remote HSL network IOP (representing another node in the cluster) that has been enrolled to receive VPD updates for the towers in the node domain.

In general, when a tower packaging HRI object comes into existence, that object enrolls the tower with the resource manager, e.g., by storing a pointer to the object in the first resource manager data structure. If VPD in the packaging HRI object gets updated, as may happen if a piece of hardware in the tower is added or replaced, the tower packaging HRI object also notifies the resource manager that an update has occurred. When a tower packaging HRI object goes away, that object requests that the resource manager remove the identifier for the object from the first data structure.

In addition, when a remote HSL network IOP object (IOP HW Driver) comes into existence or when an existing HSL network IOP object re-establishes its connection to the other node, that object enrolls its associated remote node with the resource manager as a client that wants to be notified of tower and bus adapter VPD updates. When a remote HSL network IOP goes away or detects that the remote node it communicates with has gone down, it requests that the resource manager remove it from the second data structure.

In the illustrated embodiment, enrollment of a client node with a resource manager incorporates the creation or instantiation of a "client action" object that includes a "doit" or analogous method that initiates the transmission of relevant VPD to the associated node via the remote HSL network IOP object for that node. An identifier to the client action object, e.g., a pointer, is stored in the second data structure in the resource manager.

As such, whenever a tower enrolls itself or notifies the resource manager of an update, the resource manager runs through the list of client action objects identified in the second data structure, invoking the "doit" method on each object, and passing the tower that is enrolling or updating. The resource manager is otherwise unaware of what actually occurs as a result of invoking the "doit" method. The actions that remote HSL network IOP objects enroll cause the appropriate tower and bus adapter VPD associated with the tower enrolling or updating to be packaged up and passed across the functional connection to the node on the other end of the remote HSL network IOP's connection. The node receiving the data creates or updates the bus adapter HRI object for the bus adapter whose data is being passed across, and persists the tower VPD to be used to build the tower packaging HRI object if the tower is ever switched to it. In this way all clients that need to be notified about new towers and tower updates are so notified when a tower comes into existence or is updated.

When a client node enrolls with the resource manager, the resource manager adds the identifier for the associated client action object to its list of client action objects, and runs the list of enrolled towers, pushing the "doit" method on the client's action object for each tower. In this way, when a remote HSL network IOP client enrolls, the system it communicates with over its functional connection immediately receives the necessary VPD for all towers in the domain of the node on which the client resides.

Figure 4:
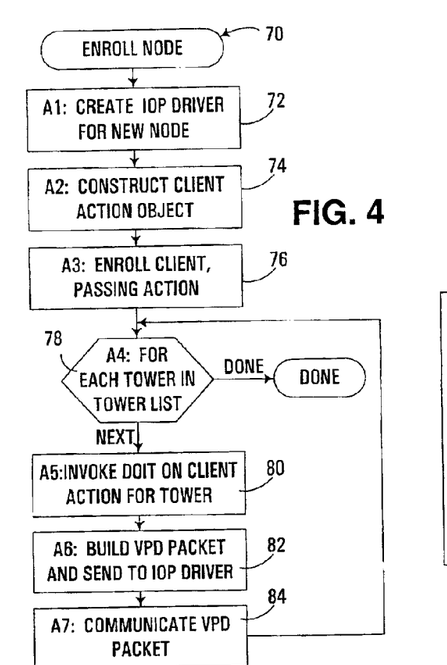
FIG. 4 is a flowchart illustrating the program flow of an enroll node routine executed by a node in the clustered computer system of FIGS. 1 and 2.
Figure 5:
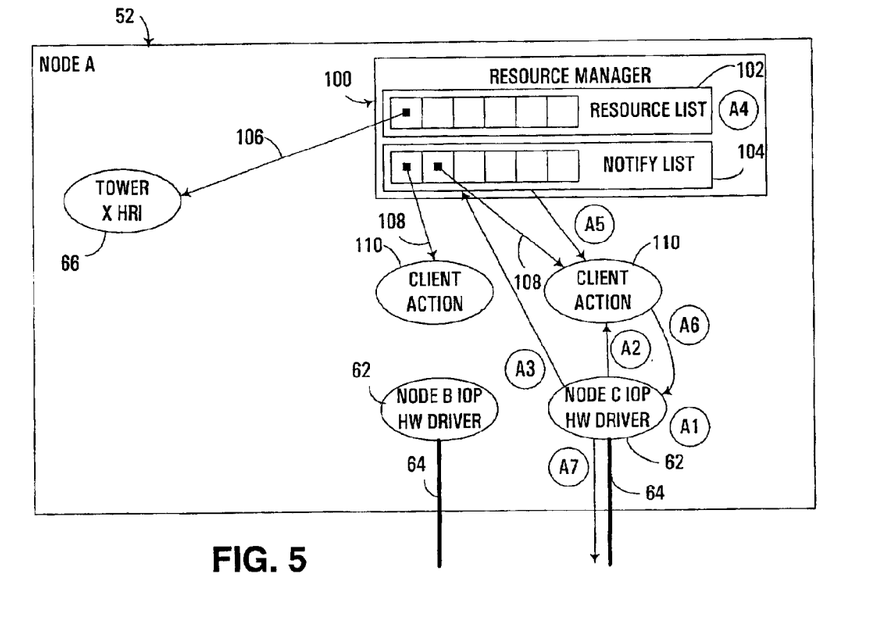
FIG. 5 is a block diagram of the relevant software entities in an exemplary node, illustrating the information flow that occurs during performance of the enroll node routine of FIG. 4.

FIGS. 4 and 5, for example, illustrate the operations that occur in connection with execution of an enroll node routine 70 (FIG. 4) on a node. As shown in FIG. 5, for example, resident on Node A may be program code that implements a resource manager 100, including first and second data structures (resource list 102 and notify list 104), which respectively store identifiers to the resources (towers) in the domain of Node A, and identifiers to the additional cluster nodes to be notified in response to resource updates. Various data structures may be used to implement each list 102, 104, e.g., linked lists, arrays, etc.

Stored within list 102 are pointers 106 to the tower HRI object 66 for each tower within the node domain. Likewise, stored within list 104 are pointers 108 to client action objects 110 established for each IOP hardware driver 62.

FIG. 5 illustrates the result of an enroll node process performed to enroll Node C with the Node A resource manager 100, with the assumption that at the time of the enrollment, both Tower X and Node B have previously been enrolled with the resource manager. The operations that occur in connection with enrolling a node are represented by steps A1–A7, which correspond to blocks 72–84 of routine 70 (FIG. 4).

Routine 70 typically begins by creating an IOP hardware driver for a new node in step A1 (block 72), typically in response to an attempt by a remote node to establish a logical connection with the node. As is known in the art, when a remote node is brought up, that node will "walk" the RIO loop, and attempt to establish a logical connection with every other node on the loop. Any node that receives an attempt to establish a logical connection will thus create the appropriate IOP hardware driver 62 for the remote node, and result in the creation of a logical connection 64 with the remote node over the RIO loop. In the alternative, creation of an IOP hardware driver may be manually initiated.

Next, in step A2 (block 74), a client action object 110 is created, including a wrapper object and a "doit" routine that initiates the transfer of relevant VPD over the logical connection 64 established with an IOP hardware driver 62 for the remote node. Next, in step A3 (block 76) the client is enrolled with the resource manager 100, by passing a pointer 108 to the client action object 110 to the resource manager for storage in list 104.

Next, in step A4 (block 78), the resource manager runs through each tower in list 102, invoking step A5 (block 80) for each tower to invoke the "doit" routine on the client action object 110, passing a reference to the tower packaging HRI object therefor. Next, in step A6 (block 82), the client action object "doit" routine builds a VPD packet, including the tower VPD accessible from the tower packaging HRI object, and forwards the packet to the IOP hardware driver for the remote node. Then, in step A7 (block 84), the IOP hardware driver transmits the packet over the RIO loop to the remote node, thereby distributing the VPD to the remote node. The VPD is thereafter persisted in the remote node and used by the remote node should it ever be desirable to obtain functional ownership of the tower. Once the packet has been sent, control then returns to step A4 (block 78) to invoke the "doit" method for the next tower in the list (if any). Once all towers have been processed, routine 70 is complete.

Figure 6:
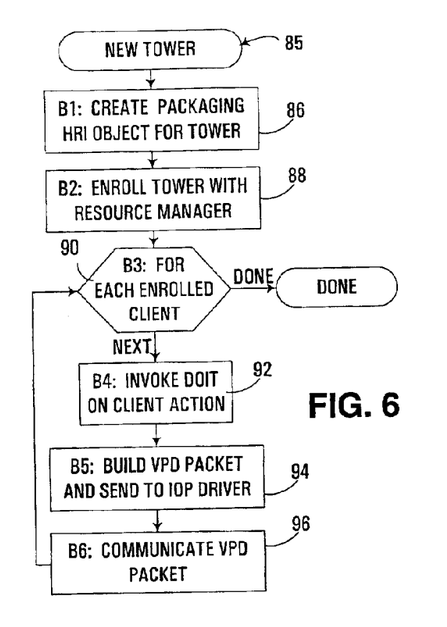
FIG. 6 is a flowchart illustrating the program flow of a new tower routine executed by a node in the clustered computer system of FIGS. 1 and 2.
Figure 7:
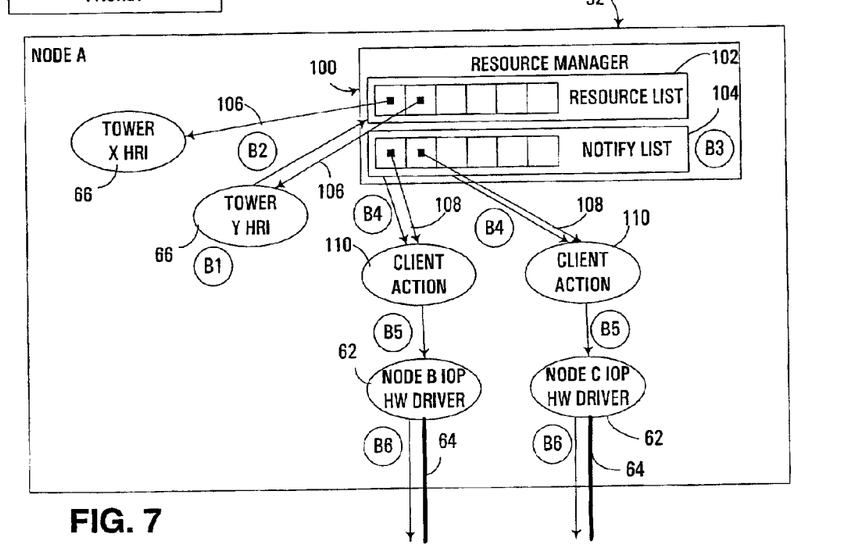
FIG. 7 is a block diagram of the node illustrated in FIG. 5, illustrating the information flow that occurs during performance of the new tower routine of FIG. 6.

FIGS. 6 and 7 next illustrate the operations that occur in connection with execution of a new tower routine 85 (FIG. 6) on a node. FIG. 7, in particular, illustrates the resulting objects that are disposed in Node A subsequent to connection of a new tower (Tower Y) to the node. The operations that occur in connection with connection of the new tower are represented by steps B1–B6, which correspond to blocks 86–96 of routine 85 (FIG. 6).

Routine 85 typically begins by creating a packaging HRI object for the new tower in step B1 (block 86). Typically, creation of the packaging HRI object is performed by a bus manager subsequent to detecting a new tower. Generally, when a new tower is detected, the bus manager will establish logical bus objects for the tower, and look for a packaging HRI object for the tower. If no packaging HRI object is found, then a new object is created as represented by step B1.

Next, in step B2 (block 88), the tower is enrolled with the resource manager 100 by passing a pointer 106 to the Tower Y packaging HRI object 66 to the resource manager for storage in list 102.

Next, in step B3 (block 90), the resource manager runs through each enrolled client in list 104, invoking step B4 (block 92) for each enrolled client to invoke the "doit" routine on the associated client action object 110 therefor, passing a reference to the Tower Y tower packaging HRI object. Next, in step B5 (block 94), the client action object "doit" routine builds a VPD packet, including the Tower Y VPD accessible from the associated tower packaging HRI object, and forwards the packet to the associated 10P hardware driver. Then, in step B6 (block 96), the IOP hardware driver transmits the packet over the RIO loop to the remote node, thereby distributing the new tower VPD to the node. The VPD is thereafter persisted in the remote node and used by the remote node should it ever be desirable to obtain functional ownership of the tower. Once the packet has been sent, control then returns to step B3 (block 90) to invoke the "doit" method for the client action object in the list (if any). Once all clients have been notified, routine 85 is complete.

It should be appreciated that, for a change to the VPD for a tower, a routine similar to routine 85 would be executed, except that no new packaging HRI object would need to be created, nor would the tower need to be enrolled with the resource manager. Rather, the update could be used to trigger the loop beginning at step B3 to notify all clients of the update and send the new version of the tower VPD to all enrolled clients. It should also be appreciated that a complete set of VPD for a tower may be sent in a VPD packet to each other node. In the alternative, only that portion of the VPD that has changed, or some other subset of the VPD for a tower, may be sent at any given time.

Similarly, it should be appreciated that, for a remote node that was once active in a cluster, but that comes back online, a routine similar to routine 70 may be used, except that no new IOP driver would need to be created.

Various modifications may be made without departing from the spirit and scope of the invention. For example, while the illustrated embodiments used distributed resource managers and associated lists for each node domain, in other embodiments, centralized resource management may be used. In other embodiments, notifications of updates could be sent independent of configuration data, such that remote nodes could initiate retrieval of the configuration data as needed.

Various additional modifications will be apparent to one of ordinary skill in the art having the benefit of the instant disclosure. Therefore, the invention lies in the claims hereinafter appended.

What is claimed is:

1. A method of managing switchable resources in a first node among a plurality of nodes in a clustered computer system, the method comprising, in the first node:
   (a) enrolling at least one additional node with a resource manager to receive notifications of updates to a switchable resource in the clustered computer system; and
   (b) in response to an update to the switchable resource, notifying each node enrolled with the resource manager of the update.

2. The method of claim 1, wherein the resource manager is configured to generate notifications for each switchable resource within a domain of the first node.

3. The method of claim 1, wherein the update comprises addition of the switchable resource to the clustered computer system.

4. The method of claim 1, wherein the update comprises modification of configuration data associated with the switchable resource.

5. The method of claim 1, wherein notifying each node comprises transmitting configuration data associated with the switchable resource.

6. The method of claim 5, wherein the configuration data is selected from the group consisting of unique identifier data, architecture map data, field replaceable unit configuration data, and combinations thereof.

7. The method of claim 5, wherein the switchable resource comprises a switchable tower, and wherein the configuration data includes vital product data for the switchable tower and any field replaceable units incorporated therein.

8. The method of claim 1, wherein enrolling the additional node comprises enrolling a remote network object with the resource manager, the remote network object resident in the first node and configured to communicate with the additional node over a logical communication path, and wherein notifying each node enrolled with the resource manager of the update includes communicating configuration data associated with the switched resource over the logical communication path.

9. The method of claim 8, wherein enrolling the additional node comprises creating a client action object configured to initiate the communication of configuration data over the logical communication path by interacting with the remote network object, wherein notifying each node enrolled with the resource manager of the update further includes invoking the client action object.

10. The method of claim 1, further comprising enrolling the switchable resource with the resource manager, wherein notifying each node enrolled with the resource manager is performed in response to enrolling the switchable resource with the resource manager.

11. The method of claim 10, further comprising transmitting to the additional node configuration data associated with each switchable resource enrolled with the resource manager in response to enrolling the additional node with the resource manager.

12. A method of managing switchable resources in a first node among a plurality of nodes in a clustered computer system, the method comprising, in the first node:
(a) enrolling at least one additional node with a resource manager to receive notifications of updates to a switchable resource in the clustered computer system; and
(b) in response to an update to the switchable resource, notifying each node enrolled with the resource manager of the update;
wherein the resource manager is configured to generate notifications for each switchable resource within a power domain of the first node.

13. A method of managing switchable resources in a first node among a plurality of nodes in a clustered computer system, the method comprising, in the first node:
(a) enrolling at least one additional node with a resource manager to receive notifications of updates to a switchable resource in the clustered computer system; and
(b) in response to an update to the switchable resource, notifying each node enrolled with the resource manager of the update;
wherein the switchable resource comprises a switchable tower, and wherein the update comprises a modification to a set of field replaceable units installed within the switchable tower.

14. An apparatus, comprising:
(a) a first node configured for use in a clustered computer system;
(b) a first data structure resident in the node and configured to identify a switchable resource;
(c) a second data structure resident in the node and configured to identify each additional node in the clustered computer system to be notified in response to an update to the switchable resource identified in the first data structure; and
(d) program code resident in the node and configured to notify each node identified in the second data structure in response to an update to the switchable resource identified in the first data structure;
wherein the program code is configured to generate notifications for each switchable resource within a power domain of the first node.

15. An apparatus, comprising:
(a) a first node configured for use in a clustered computer system;
(b) a first data structure resident in the node and configured to identify a switchable resource;
(c) a second data structure resident in the node and configured to identify each additional node in the clustered computer system to be notified in response to an update to the switchable resource identified in the first data structure; and
(d) program code resident in the node and configured to notify each node identified in the second data structure in response to an update to the switchable resource identified in the first data structure;
wherein the switchable resource comprises a switchable tower, and wherein the update comprises a modification to a set of field replaceable units installed within the switchable tower.

16. An apparatus, comprising:
(a) a first node configured for use in a clustered computer system;
(b) a first data structure resident in the node and configured to identify a switchable resource;
(c) a second data structure resident in the node and configured to identify each additional node in the clustered computer system to be notified in response to an update to the switchable resource identified in the first data structure; and
(d) program code resident in the node and configured to notify each node identified in the second data structure in response to an update to the switchable resource identified in the first data structure, the program code further configured to enroll a second node to be notified in response to an update to the switchable resource by updating the second data structure to identify the second node.

17. The apparatus of claim 16, wherein the program code is configured to generate notifications for each switchable resource within a domain of the first node.

18. The apparatus of claim 16, wherein the update comprises addition of the switchable resource to the clustered computer system, wherein the program code is configured to update the first data structure to identify the switchable resource in response to detection of the switchable resource.

19. The apparatus of claim 16, wherein the update comprises modification of configuration data associated with the switchable resource.

20. The apparatus of claim 16, wherein the program code is configured to notify each node by transmitting configuration data associated with the switchable resource.

21. The apparatus of claim 20, wherein the configuration data is selected from the group consisting of unique identifier data, architecture map data, field replaceable unit configuration data, and combinations thereof.

22. The apparatus of claim 20, wherein the switchable resource comprises a switchable tower, and wherein the configuration data includes vital product data for the switchable tower and any field replaceable units incorporated therein.

23. The apparatus of claim 16, wherein the program code is configured to enroll the second node by creating a client action object associated with the second node, the client action object configured to initiate a communication of configuration data over a logical communication path established to the second node from a remote network object resident on the first node.

24. The apparatus of claim 16, wherein the program code is configured to transmit to the second node configuration data associated with each switchable resource identified in the first data structure in response to enrolling the second node.

25. The apparatus of claim 16, wherein the program code is configured to enroll the switchable resource by storing the identifier for the switchable resource in the first data structure, and to notify each node identified in the second data structure in response to enrolling the switchable resource.

26. A clustered computer system, comprising:
   (a) a switchable resource;
   (b) first and second nodes; and
   (c) program code resident in the first node and configured to enroll the second node to receive notifications of updates to the switchable resource, the program code further configured to, in response to an update to the switchable resource, notify each enrolled node of the update.

27. A program product, comprising:
   (a) program code configured for use in a first node of a clustered computer system to enroll a second node to receive notifications of updates to a switchable resource, and to, in response to an update to the switchable resource, notify each enrolled node of the update;
   (b) a signal bearing medium bearing the program code.

28. The program product of claim 27, wherein the signal bearing medium includes at least one of a recordable medium and a transmission medium.

* * * * *